US012697905B2

(12) United States Patent
Liu

(10) Patent No.: US 12,697,905 B2
(45) Date of Patent: Aug. 4, 2026

(54) CHILD SAFETY SEAT

(71) Applicant: BAMBINO PREZIOSO SWITZERLAND AG, Steinhausen (CH)

(72) Inventor: Zu Jian Liu, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 140 days.

(21) Appl. No.: 18/248,490

(22) PCT Filed: Oct. 12, 2021

(86) PCT No.: PCT/EP2021/078117
§ 371 (c)(1),
(2) Date: Apr. 10, 2023

(87) PCT Pub. No.: WO2022/078988
PCT Pub. Date: Apr. 21, 2022

(65) Prior Publication Data
US 2023/0373365 A1      Nov. 23, 2023

(30) Foreign Application Priority Data

Oct. 12, 2020    (CN) ......................... 202022265906.X

(51) Int. Cl.
B60N 2/28          (2006.01)

(52) U.S. Cl.
CPC ......... B60N 2/2869 (2013.01); B60N 2/2821 (2013.01)

(58) Field of Classification Search
CPC ............................ B60N 2/2869; B60N 2/2821
See application file for complete search history.

(56) References Cited

U.S. PATENT DOCUMENTS 4,971,392 A      11/1990  Young
6,481,794 B1 *  11/2002  Kassai .................. B60N 2/2881
                                                            297/484
(Continued)

FOREIGN PATENT DOCUMENTS

CN          201124777  Y      10/2008
CN          207809123  U       9/2018
(Continued)

OTHER PUBLICATIONS

PCT Notification of Transmittal of The International Search Report and the Written Opinion of the International Searching Authority, or the Declaration; International Application No. PCT/EP2021/078117; International Filing Date: Oct. 12, 2021; Date of Mailing: Jan. 28, 2022; pp. 1-10.

*Primary Examiner* — Philip F Gabler
(74) *Attorney, Agent, or Firm* — I CANTOR COLBURN LLP

(57) ABSTRACT

A child safety seat (100) is provided and includes a base (10), a seat body (20) installed on the base (10), a locking device (40), a locked portion (11) and an operating component (30) movably linked to the locking device (40). The seat body (20) is switchable between a forward-facing orientation and a rearward-facing orientation. The locking device (40) and the locked portion (11) are respectively disposed on one and another one of the seat body (20) and the base (10). The locking device (40) engages with the locked portion (11) when the seat body (20) is located in the forward-facing orientation or the rearward-facing orientation. The operating component (30) drives the locking device (40) to disengage from the locked portion (11) for allowing the seat body (20) to switch between the forward-facing orientation and the rearward-facing orientation.

12 Claims, 8 Drawing Sheets

100

(56)　　　　　References Cited

U.S. PATENT DOCUMENTS

| | | | | |
|---|---|---|---|---|
| 7,731,284 | B2 * | 6/2010 | Lhomme | B60N 2/2869 |
| | | | | 297/256.16 |
| 8,459,739 | B2 * | 6/2013 | Tamanouchi | B60N 2/2827 |
| | | | | 297/256.16 |
| 8,702,169 | B2 * | 4/2014 | Abadilla | B60N 2/2869 |
| | | | | 297/256.16 |
| 9,090,182 | B2 * | 7/2015 | Rabeony | B60N 2/2863 |
| 11,584,267 | B2 * | 2/2023 | Longenecker | B60N 2/2821 |
| 2009/0091167 | A1 * | 4/2009 | Jha | B60N 2/42709 |
| | | | | 297/256.12 |
| 2017/0355287 | A1 | 12/2017 | Anderson et al. | |
| 2019/0077282 | A1 * | 3/2019 | Reaves | B60N 2/2872 |

FOREIGN PATENT DOCUMENTS

| | | | |
|---|---|---|---|
| CN | 208813033 U | 5/2019 |
| CN | 209776241 U | 12/2019 |
| CN | 211567741 U | 9/2020 |

* cited by examiner

100

100

<u>100</u>

100

40

CHILD SAFETY SEAT

CROSS REFERENCE TO RELATED APPLICATIONS

This application is a National Stage application of PCT/EP2021/078117, filed Oct. 12, 2021, which claims the benefit of Chinese Application No. 202022265906.X, filed Oct. 12, 2020, both of which are incorporated by reference in their entirety herein.

FIELD OF THE INVENTION

The present application relates to a child safety seat according to the pre-characterizing clause of claim 1.

BACKGROUND OF THE INVENTION

A child safety seat is a device configured to be installed on a car and for allowing a child to sit therein to ensure the child's riding safety. Currently, there is a child safety seat having a base and a seat body pivotally installed on the base for enabling the child safety seat to be switchable between a forward-facing state and a rearward-facing state by a rotating movement of the seat body relative to the base according to the child's age or body shape. Besides, in order to ensure using safety, there is another child safety seat further having a locking device for locking the child safety seat to position the child safety seat in the forward-facing state or the rearward-facing state. However, the conventional locking device has complicated structure and difficult operation. Therefore, an improvement is required.

SUMMARY OF THE INVENTION

Therefore, the present application aims to provide a child safety seat with simple structure and easy operation.

This is achieved by a child safety seat according to claim 1. The dependent claims pertain to corresponding further developments and improvements.

As will be seen more clearly from the detail description, the claimed child safety seat includes a base, a seat body, a locking device, at least one locked portion and an operating component. The seat body is installed on the base. The seat body is switchable between a forward-facing orientation and a rearward-facing orientation. The locking device is disposed on one of the seat body and the base. The at least one locked portion is disposed on another one of the seat body and the base. The locking device engages with the at least one locked portion to lock the seat body for restraining the seat body when the seat body is located in the forward-facing orientation or the rearward-facing orientation. The operating component is disposed on the seat body or the base. The operating component is movably linked to the locking device, and the operating component drives the locking device to disengage from the at least one locked portion for allowing the seat body to switch between the forward-facing orientation and the rearward-facing orientation.

According to an embodiment of the present application, the seat body is pivotally connected to the base around a pivoting axis.

According to an embodiment of the present application, the child safety seat further includes a first pivoting structure and a second pivoting structure. The first pivoting structure and the second pivoting structure are respectively disposed on the seat body and the base, so that the seat body is pivotally installed on the base by a cooperation of the first pivoting structure and the second pivoting structure.

According to an embodiment of the present application, one and another one of the first pivoting structure and the second pivoting structure are respectively a pivoting table and a pivoting recess.

According to an embodiment of the present application, the at least one locked portion includes two locked portions opposite to each other relative to the pivoting axis along a radial direction.

According to an embodiment of the present application, one of the two locked portions is disposed on a front portion of the another one of the seat body and the base. Another one of the two locked portions is disposed on a rear portion of the another one of the seat body and the base, and the locking device is disposed on a front portion or a rear portion of the one of the seat body and the base.

According to an embodiment of the present application, the locking device includes a locking component. The locking component is configured to be telescopic. The operating component is movably linked to the locking component. The seat body is locked when the locking component extends outwardly to engage with the at least one locked portion, and the seat body is unlocked when the locking component retracts inwardly to disengage from the at least one locked portion.

According to an embodiment of the present application, the locking component engages with the at least one locked portion by an insertion of the locking component into the at least one locked portion.

According to an embodiment of the present application, the at least one locked portion is an engaging hole.

According to an embodiment of the present application, the child safety seat further includes a linking component disposed between the operating component and the locking component. A first end of the linking component is installed on the operating component, and a second end of the linking component is installed on the locking component.

According to an embodiment of the present application, the linking component is disposed inside the one of the seat body and the base.

According to an embodiment of the present application, the child safety seat further includes a resilient structure for configuring the locking component to be telescopic.

According to an embodiment of the present application, the locking device further includes a holding component. A sliding chamber is formed on the holding component. The locking component is slidably disposed inside the sliding chamber. A first opening is formed on the holding component and communicated with the sliding chamber. A second opening is formed on the one of the seat body and the base and mated to be communicated with the first opening, and the resilient structure is disposed between the locking component and the holding component for driving the locking component to extend out of the second opening.

According to an embodiment of the present application, a first stopping structure and a second stopping structure are formed on the sliding chamber. The first stopping structure is located adjacent to the first opening. The second stopping structure is located away from the first opening, and a stopped structure protrudes from an outer periphery of a portion of the locking component located between the first stopping structure and the second stopping structure.

According to an embodiment of the present application, the first stopping structure is a step-shaped structure, the second stopping structure is a protruding structure inwardly protruding from a wall of the sliding chamber, and the stopped structure is a ring-shaped structure.

According to an embodiment of the present application, the operating component is a handle or a button.

In contrast to the prior art, in the present application, the child safety seat is switchable between different states by a pivotal movement of the seat body relative to the base. The seat body can be locked and restrained from moving away from the forward-facing orientation or the rearward-facing orientation when the locking device engages with the locked portion. The operating component can be operated to drive the locking device to disengage from the locked portion to unlock the seat body for allowing the seat body to switch between the forward-facing orientation and the rearward-facing orientation. Therefore, the present application has advantages of simple structure and easy operation.

These and other objectives of the present application will no doubt become obvious to those of ordinary skill in the art after reading the following detailed description of the preferred embodiment that is illustrated in the various figures and drawings.

BRIEF DESCRIPTION OF THE DRAWINGS

In the following, the present application is further illustrated by way of example, taking reference to the accompanying drawings. Thereof

DETAILED DESCRIPTION

In order to illustrate technical specifications and structural features as well as achieved purposes and effects of the present application, relevant embodiments and figures are described as follows.

In the following detailed description of the preferred embodiments, reference is made to the accompanying drawings which form a part hereof, and in which is shown by way of illustration specific embodiments in which the present application may be practiced. In this regard, directional terminology, such as "top", "bottom", "right", "left", "front", "back", etc., is used with reference to the orientation of the Figure(s) being described. The components of the present application can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is connected to a second device, that connection may be through a direct mechanical connection, or through an indirect mechanical connection via other devices and connections.

Figure 1:
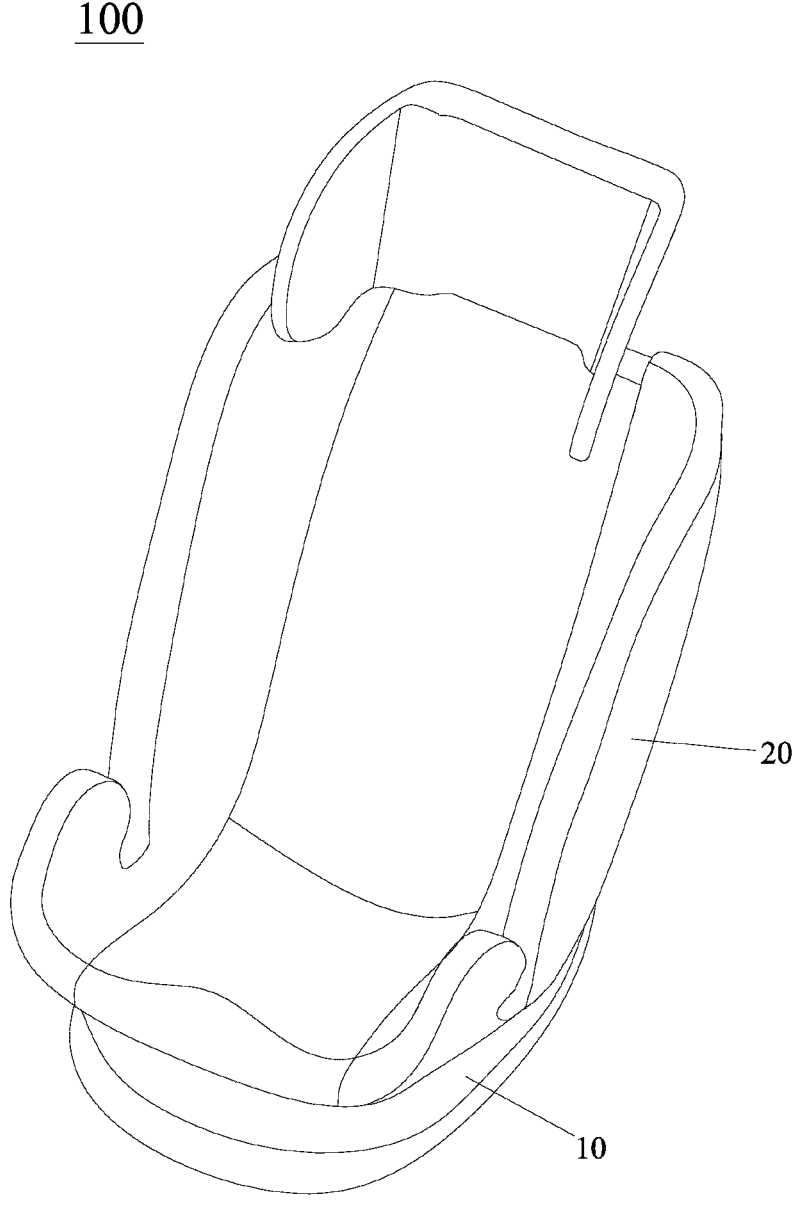
FIG. 1 to FIG. 3 are diagrams of a child safety seat in different states according to an embodiment of the present application.
Figure 2:
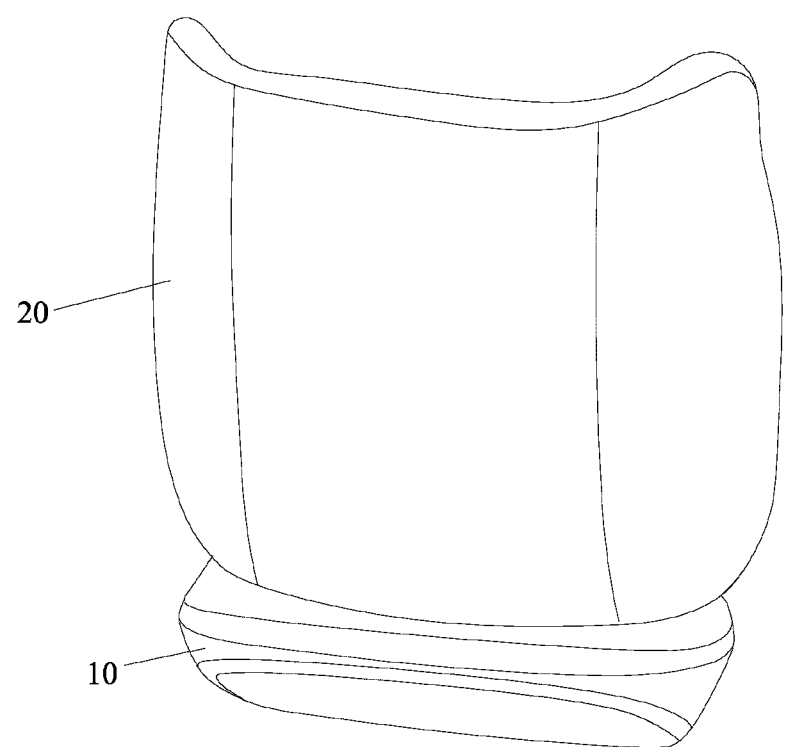
Figure 3:
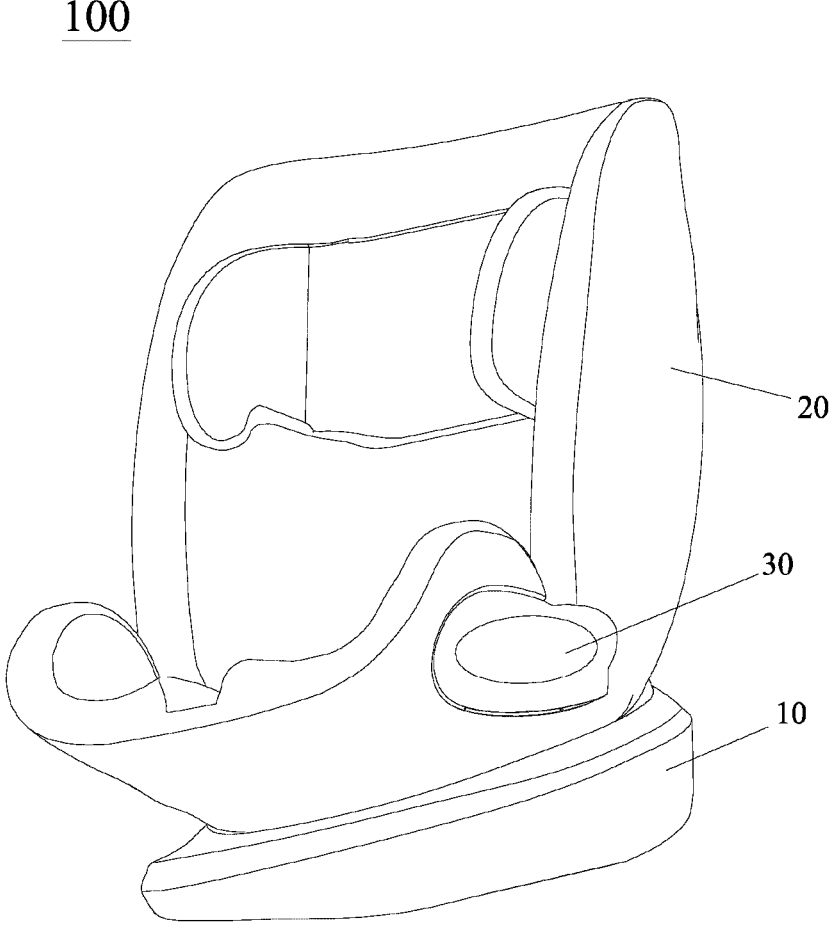

Please refer to FIG. 1 to FIG. 3. FIG. 1 to FIG. 3 are diagrams of a child safety seat 100 in different states according to an embodiment of the present application. As shown in FIG. 1 to FIG. 3, the child safety seat 100 includes a base 10, a seat body 20 installed on the base 10, and an operating component 30 disposed on the seat body 20. The seat body 20 is switchable between a forward-facing orientation as shown in FIG. 1 and a rearward-facing orientation as shown in FIG. 2 relative to the base 10. Furthermore, the child safety seat 100 further includes a locking device 40 disposed on the seat body 20, and two locked portions 11 disposed on the base 10 and for cooperating with the locking device 40. The locking device 40 can engage with the corresponding locked portions 11 for restraining the seat body 20 from moving relative to the base 10 when the seat body 20 is located in the forward-facing orientation as shown in FIG. 1 and the rearward-facing orientation as shown in FIG. 2 relative to the base 10. The operating component 30 is movably linked to the locking device 40 and configured to drive the locking device 40 to disengage from the corresponding locked portion 11 for allowing the seat body 20 to move relative to the base 10 when the operating component 30 is operated. In the present application, the child safety seat 100 is switchable between different states by a movement of the seat body 20 relative to the base 10. The seat body 20 can be locked and restrained from moving away from the forward-facing orientation or the rearward-facing orientation when the locking device 40 engages with the corresponding locked portion 11. The operating component 30 can be operated to drive the locking device 40 to disengage from the corresponding locked portion 11 to unlock the seat body 20 for allowing the seat body 20 to switch between the forward-facing orientation and the rearward-facing orientation. Therefore, the present application has advantages of simple structure and easy operation.

However, the configurations of the locking device, the locked portion and the operating component are not limited to this embodiment. Any structure or mechanism which utilizes engagement or disengagement of the locking device and the locked portion for restraining or allowing the movement of the seat body relative to the base is included within the scope of the present application. In other words, the locking device and the locked portion can be respectively disposed on one and another one of the seat body and the base, and the operating component can be disposed on the seat body or the base. For example, in another embodiment, the locking device and the locked portion can be respectively disposed on the seat body and the base, and the operating component can be disposed on the base. Alternatively, in another embodiment, the locking device and the locked portion can be respectively disposed on the base and the seat body, and the operating component can be disposed on the base. Alternatively, in another embodiment, the locking device and the locked portion can be respectively disposed on the base and the seat body, and the operating component can be disposed on the seat body.

Besides, the numbers of the locking device, the locked portion and the operating component are not limited to this embodiment. It depends on practical demands. For example, in another embodiment, the child safety seat can only include one locked portion, one locking device and one operating component, and the locking device can be configured to engage with the locked portion when the seat body is located in the forward-facing orientation or the rearward-facing orientation only.

Figure 4:
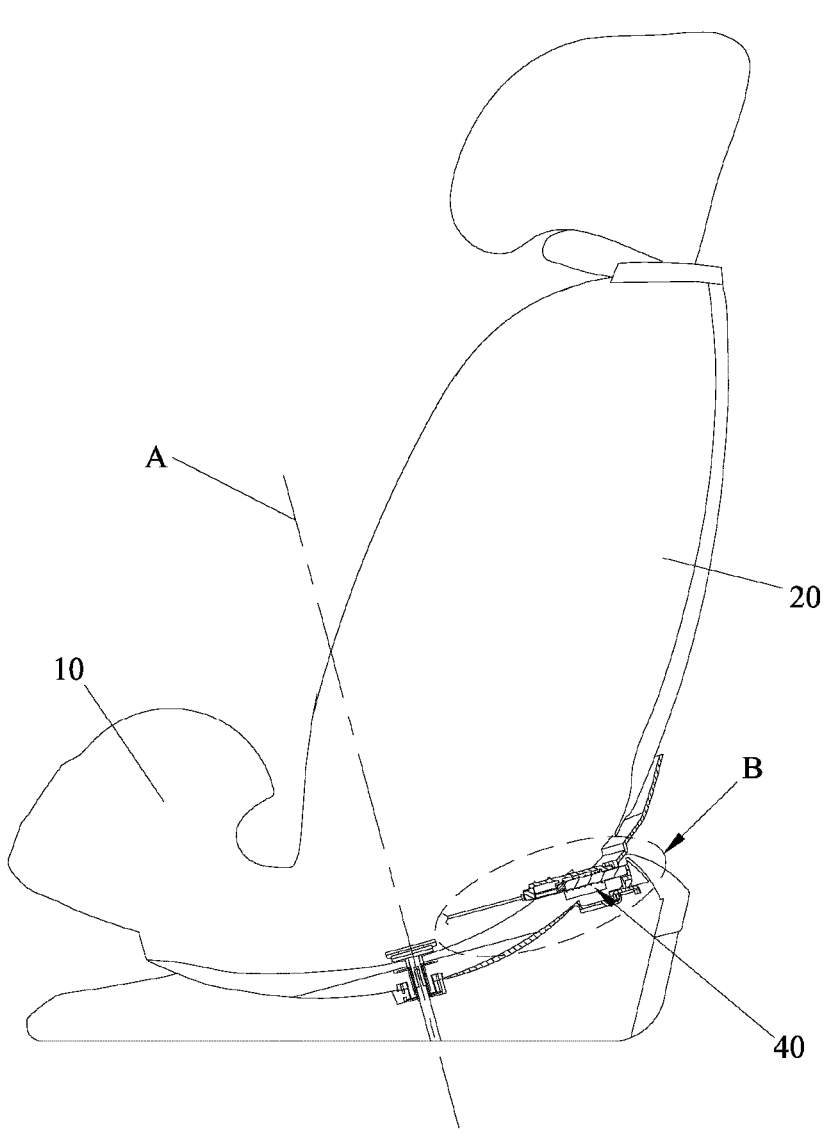
FIG. 4 is a partial internal structural diagram of the child safety seat according to the embodiment of the present application.
Figure 5:
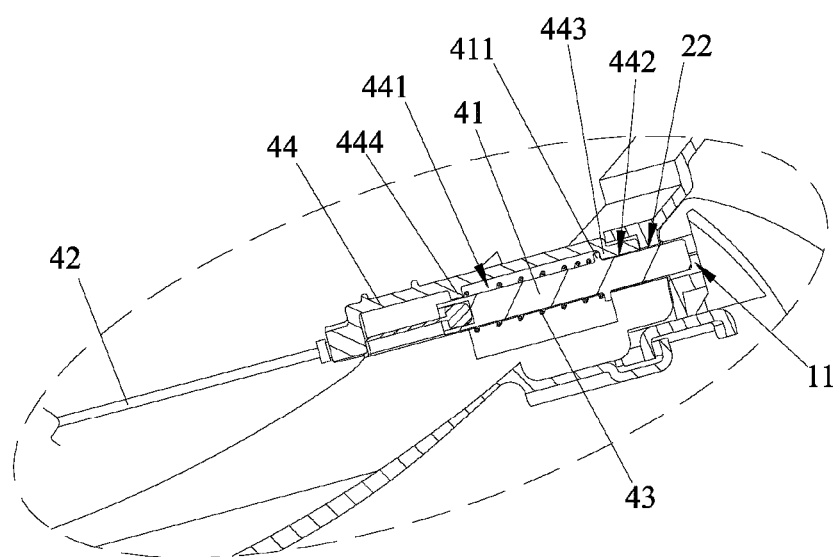
FIG. 5 is an enlarged diagram of an A portion of the child safety seat shown in FIG. 4 according to the embodiment of the present application.
Figure 6:
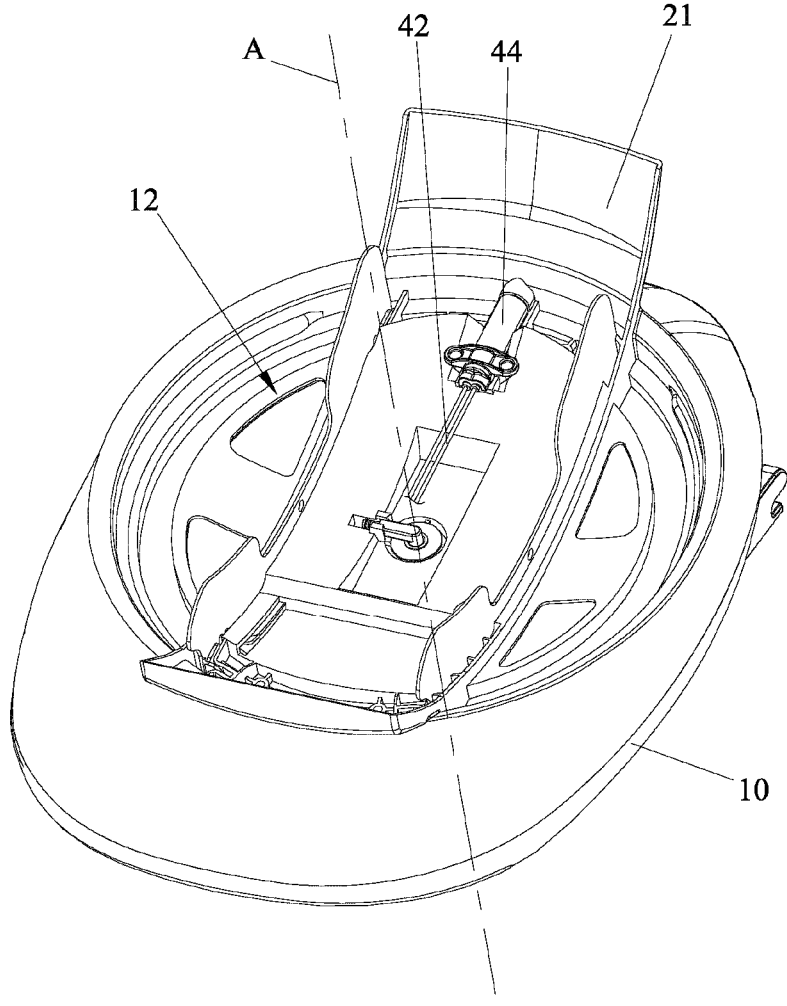
FIG. 6 is a partial diagram of the child safety seat according to the embodiment of the present application.

Please refer to FIG. 4 to FIG. 6. FIG. 4 is a partial internal structural diagram of the child safety seat 100 according to the embodiment of the present application. FIG. 5 is an enlarged diagram of an A portion of the child safety seat 100 shown in FIG. 4 according to the embodiment of the present application. FIG. 6 is a partial diagram of the child safety seat 100 according to the embodiment of the present application. As shown in FIG. 4 to FIG. 6, the seat body 20 is pivotally connected to the base 10 around a pivoting axis A for facilitating a switching operation of the seat body 20 relative to the base 10. Preferably, in this embodiment, a pivotal range of the seat body 20 relative to the base 10 around the pivoting axis A can be 360 degrees. However, the present application is not limited to this embodiment.

Specifically, in order to achieve a pivotal connection of the seat body 20 and the base 10, the child safety seat 100 further includes a first pivoting structure 21 disposed on the seat body 20 and a second pivoting structure 12 disposed on the base 10. The first pivoting structure 21 and the second pivoting structure 12 pivotally cooperate with each other. The seat body 20 can be pivotally installed on the base 10 by a pivotal cooperation of the first pivoting structure 21 and the second pivoting structure 12. Preferably, the first pivoting structure 21 is installed on a bottom portion of the seat body 20, and the second pivoting structure 12 is disposed on a top portion of the base 10, in order for easy installation. More specifically, in order to make structure of the child safety seat 100 more compact and aesthetic, the first pivoting structure 21 and the second pivoting structure 12 can be a pivoting table and a pivoting recess, respectively, and the pivoting table is disposed inside the pivoting recess. However, the present application is not limited thereto. For example, in another embodiment, the first pivoting structure and the second pivoting structure can be a pivoting recess disposed on the bottom portion of the seat body and a pivoting table installed on the top portion of the base, respectively.

Figure 7:
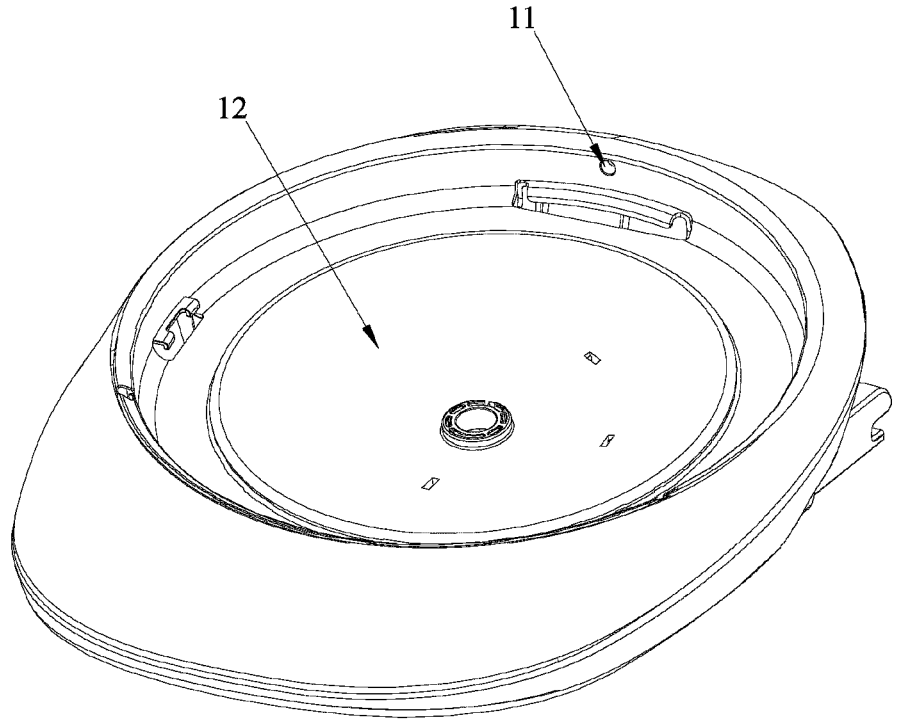
FIG. 7 and FIG. 8 are diagrams of a base at different views according to the embodiment of the present application.
Figure 8:
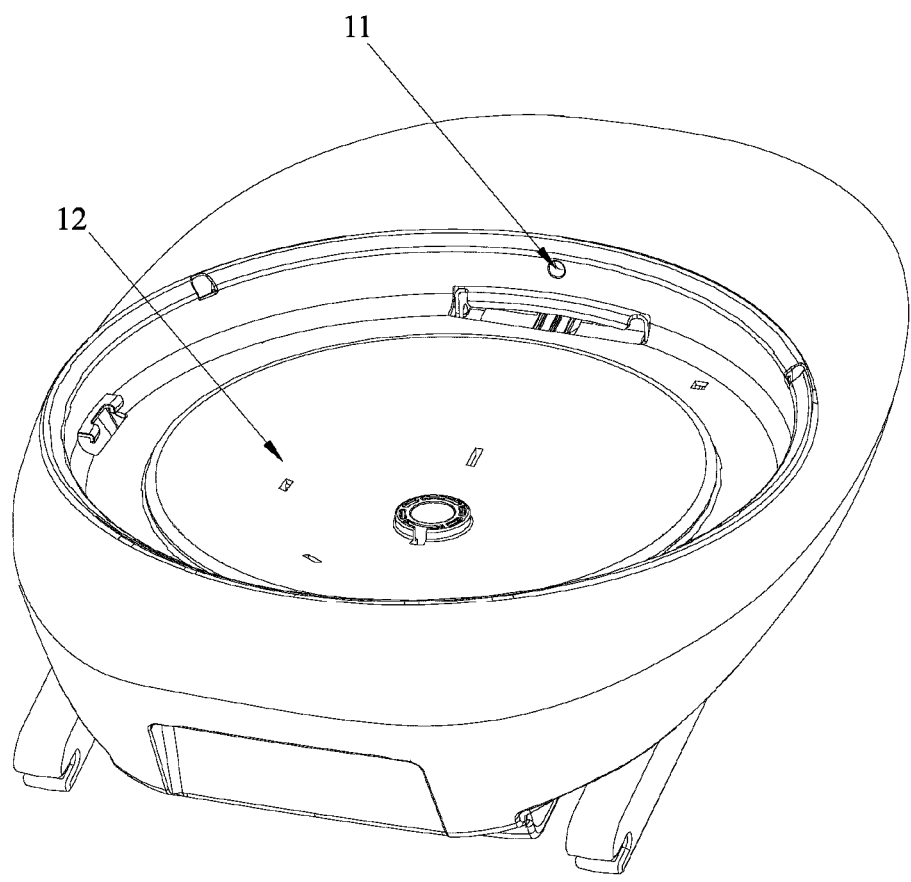

Please refer to FIG. 4 and FIG. 6 to FIG. 8. FIG. 7 and FIG. 8 are diagrams of the base 10 at different views according to the embodiment of the present application. As shown in FIG. 4 and FIG. 6 to FIG. 8, in order to allow the locking device 40 to engage with the corresponding locked portion 11 to lock the seat body 20 when the seat body 20 is located in the forward-facing orientation and the rearward-facing orientation, the two locked portions 11 are opposite to each other relative to the pivoting axis A along a radial direction. Specifically, one of the two locked portions 11 is disposed on a front portion of the base 10, and another one of the two locked portions 11 is disposed on a rear portion of the base 10. The locking device 40 is disposed on a rear portion of the seat body 20. In such a way, when the seat body 20 is located in the forward-facing orientation relative to the base 10, the locking device 40 is aligned with and engages with the locked portion 11 disposed on the rear portion of the base 10, i.e., the rear locked portion 11. When the seat body 20 is located in the rearward-facing orientation relative to the base 10, the locking device 40 is aligned with and engages with the locked portion 11 disposed on the front portion of the base 10, i.e., the front locked portion 11.

However, the present application is not limited to this embodiment. It depends on practical demands. In other words, the two locked portion can be disposed on any two opposite portions of one of the seat body and the base, and the locking device can be disposed on a corresponding portion of another one of the seat body and the base. For example, in another embodiment, when the child safety seat includes two locked portions disposed on the seat body and one locking device disposed on the base, the two locked portions can be located at a left portion and a right portion of the seat body, and the locking device can be located at a right portion of the base.

As shown in FIG. 4 to FIG. 8, the locking device 40 includes a locking component 41. The locking component 41 is configured to be telescopic. The operating component 30 is movably linked to the locking component 41. When the locking component 41 extends outwardly to engage with the corresponding locked portion 11, the seat body 20 is locked and restrained from moving relative to the base 10. When the locking component 41 retracts inwardly to disengage from the corresponding locked portion 11, the seat body 20 is unlocked and allowed to move relative to the base 10. Therefore, it is easy for a user to operate the operating component 30 to drive the locking component 41 to extend outwardly or retract inwardly to lock or unlock the seat body 20. Therefore, the present application has not only simple structure but also easy operation. Preferably, the locking component 41 engages with the corresponding locked portion 11 by an insertion of the locking component 41 into the corresponding locked portion 11. Specifically, the locked portion 11 can be an engaging hole. However, the present application is not limited thereto.

As shown in FIG. 4 to FIG. 8, in this embodiment, the operating component 30 can be a handle which drives the locking component 41 to retract inwardly relative to the seat body 20 to unlock the seat body 20 quickly when the handle is pulled by the user. However, the present application is not limited to this embodiment. For example, in another embodiment, the operating component can be a button which is configured to drive the locking component to retract inwardly relative to the seat body to unlock the seat body when the button is pressed by the user.

Furthermore, in order to allow the operating component 30 to drive the locking component 41 straightforwardly, the child safety seat 100 further includes a linking component 42 disposed between the operating component 30 and the locking component 41. A first end of the linking component 42 is installed on the operating component 30. A second end of the linking component 42 is installed on the locking component 42. Specifically, the linking component 42 is disposed inside the seat body 20 for hiding the linking component 42 to make structure of the child safety seat 100 compact and aesthetic.

As shown in FIG. 4 to FIG. 8, the child safety seat 100 further includes a resilient structure 43 for configuring the locking component 41 to be telescopic and driving the locking component 41 to extend outwardly to recover, so as to make structure of the child safety seat 100 more compact. Specifically, the locking device 40 further includes a holding component 44. A sliding chamber 441 is formed on the holding component 44. The locking component 41 is slidably disposed inside the sliding chamber 441. A first opening 442 is formed on the holding component 44 and communicated with the sliding chamber 441. A second opening 22 is formed on the seat body 20 and mated to be communicated with the first opening 442. The resilient structure 43 is disposed between the locking component 41 and the holding component 44 for driving the locking component 41 to extend out of the second opening 22. The aforementioned configuration enables the locking component 41 to slide stably. Therefore, the present application has better reliability.

When the seat body 20 is located in the forward-facing orientation or the rearward-facing orientation relative to the base 10, the second opening 22 is aligned with the corresponding locked portion 11. Therefore, the locking component 41 can be driven by the resilient structure 43 to extend out of the second opening 22 to engage with the corresponding locked portion 11 for locking the seat body 20, i.e., for restraining the seat body 20 from moving relative to the base 20. When the operating component 30 is operated, the operating component 30 can drive the locking component 41 to retract inwardly into the second opening 22 to disengage from the corresponding locked portion 11 for unlocking the seat body 20, i.e., for allowing the seat body 20 to move relative to the base 20.

Specifically, the holding component 44 can be a hollow cylinder-shaped structure. The locking component 41 can be a column-shaped structure. The linking component 42 passes through the holding component 44 to be installed on the locking component 41. However, the present application is not limited thereto. More specifically, a first stopping structure 443 and a second stopping structure 444 are formed on the sliding chamber 441. The first stopping structure 443 is located adjacent to the first opening 442. The second stopping structure 444 is located away from the first opening 442. A stopped structure 411 protrudes from an outer periphery of a portion of the locking component 41 located between the first stopping structure 443 and the second stopping structure 444. The stopped structure 411 cooperates with the first stopping structure 443 and the second stopping structure 444 for restraining a traveling distance of the sliding locking component 41. The first stopping structure 443 can prevent an excessive extending movement of the locking component 41 for preventing a disengagement of the locking component 41 and the holding component 44. The second stopping structure 444 can prevent an excessive retracting movement of the locking component 41 for ensuring the locking component 41 to recover quickly. Specifically, the first stopping structure 443 can be a step-shaped structure. The second stopping structure 444 can be a protruding structure inwardly protruding from a wall of the sliding chamber 441. The stopped structure 411 can be a ring-shaped structure. However, the present application is not limited thereto.

As shown in FIG. 1 to FIG. 8, operational principle of the child safety seat 100 is provided as follows. When it is desired to switch the seat body 20 from the forward-facing orientation as shown in FIG. 1 to the rearward-facing orientation as shown in FIG. 2, the user can pull the operating component 30 to drive the locking component 41 to retract inwardly relative to the seat body 20 by the linking component 42 to disengage the locking component 41 from the rear locked portion 11 for unlocking the seat body 20. When the seat body 20 is unlocked, the seat body 20 can be switched from the forward-facing orientation as shown in FIG. 1 to the rearward-facing orientation as shown in FIG. 2 by the pivotal movement of the seat body 20 relative to the base 10. When the seat body 20 is located in the rearward-facing orientation as shown in FIG. 2, the resilient structure 43 can drive the locking component 41 to extend outwardly relative to the seat body 20 to engage with the front locked portion 11 for locking the seat body 20 to position the seat body 20 in the rearward-facing orientation. Similarly, when it is desired to switch the seat body 20 from the rearward-facing orientation as shown in FIG. 2 to the forward-facing orientation as shown in FIG. 1, the user can pull the operating component 30 to drive the locking component 41 to retract inwardly relative to the seat body 20 by the linking component 42 to disengage the locking component 41 from the front locked portion 11 for unlocking the seat body 20. When the seat body 20 is unlocked, the seat body 20 can be switched from the rearward-facing orientation as shown in FIG. 2 to the forward-facing orientation as shown in FIG. 1 by the pivotal movement of the seat body 20 relative to the base 10. When the seat body 20 is located in the forward-facing orientation as shown in FIG. 1, the resilient structure 43 can drive the locking component 41 to extend outwardly relative to the seat body 20 to engage with the rear locked portion 11 for locking the seat body 20 to position the seat body 20 in the forward-facing orientation.

In contrast to the prior art, in the present application, the child safety seat is switchable between different states by a pivotal movement of the seat body relative to the base. The seat body can be locked and restrained from moving away from the forward-facing orientation or the rearward-facing orientation when the locking device engages with the locked portion. The operating component can be operated to drive the locking device to disengage from the locked portion to unlock the seat body for allowing the seat body to switch between the forward-facing orientation and the rearward-facing orientation. Therefore, the present application has advantages of simple structure and easy operation.

Those skilled in the art will readily observe that numerous modifications and alterations of the device and method may be made while retaining the teachings of the present application. Accordingly, the present application should be construed as limited only by the metes and bounds of the appended claims.

What is claimed is:

1. A child safety seat comprising:

a base;

a seat body installed on the base, the seat body being switchable between a forward-facing orientation and a rearward-facing orientation;

a locking device disposed on one of the seat body and the base;

at least one locked portion disposed on another one of the seat body and the base, the locking device engaging with the at least one locked portion when the seat body is located in the forward-facing orientation or the rearward-facing orientation; and an operating component disposed on the seat body or the base, the operating component being movably linked to the locking device, and the operating component driving the locking device to disengage from the at least one locked portion for allowing the seat body to switch between the forward-facing orientation and the rearward-facing orientation, wherein the seat body is pivotally connected to the base around a pivoting axis, wherein the locking device comprises a locking component, the child safety seat including a resilient structure for configuring the locking component to be telescopic, wherein the locking device further comprises a holding component, a sliding chamber is formed on the holding component, the locking component is slidably disposed inside the sliding chamber, a first opening is formed on the holding component and communicated with the sliding chamber, a second opening is formed on the one of the seat body and the base and mated to be communicated with the first opening, wherein a first stopping structure and a second stopping structure are formed on the sliding chamber, the first stopping structure is located adjacent to the first opening, the second stopping structure is located away from the first opening, and a stopped structure protrudes from an outer periphery of a portion of the locking component located between the first stopping structure and the second stopping structure, wherein the resilient structure is arranged inside the sliding chamber and sleeved on the locking component, and the resilient structure is disposed between the locking component and the holding component for driving the locking component to extend out of the second opening, wherein the locking component comprises a portion that is configured to extend into the second opening and that is disposed entirely forward of the stopped structure, and wherein the stopped structure is configured to abut the first stopping structure to prevent the locking component from extending into the second opening beyond a predetermined distance.

2. The child safety seat of claim 1, further including a first pivoting structure and a second pivoting structure, the first pivoting structure and the second pivoting structure being respectively disposed on the seat body and the base, so that the seat body is pivotally installed on the base by a cooperation of the first pivoting structure and the second pivoting structure.

3. The child safety seat of claim 2, wherein one and another one of the first pivoting structure and the second pivoting structure are respectively a pivoting table and a pivoting recess.

4. The child safety seat of claim 1, wherein the at least one locked portion comprises two locked portions opposite to each other relative to the pivoting axis along a radial direction.

5. The child safety seat of claim 4, wherein one of the two locked portions is disposed on a front portion of the another one of the seat body and the base, another one of the two locked portions is disposed on a rear portion of the another one of the seat body and the base, and the locking device is disposed on a front portion or a rear portion of the one of the seat body and the base.

6. The child safety seat of claim 1, wherein the operating component is movably linked to the locking component, the seat body is locked when the locking component extends outwardly to engage with the at least one locked portion, and the seat body is unlocked when the locking component retracts inwardly to disengage from the at least one locked portion.

7. The child safety seat of claim 6, wherein the locking component engages with the at least one locked portion by an insertion of the locking component into the at least one locked portion.

8. The child safety seat of claim 7, wherein the at least one locked portion is an engaging hole.

9. The child safety seat of claim 6, further including a linking component disposed between the operating component and the locking component, a first end of the linking component being installed on the operating component, and a second end of the linking component being installed on the locking component.

10. The child safety seat of claim 9, wherein the linking component is disposed inside the one of the seat body and the base.

11. The child safety seat of claim 1, wherein the first stopping structure is a step-shaped structure, the second stopping structure is a protruding structure inwardly protruding from a wall of the sliding chamber, and the stopped structure is a ring-shaped structure.

12. The child safety seat of claim 1, wherein the operating component is a handle or a button.

* * * * *